US007509115B2

(12) United States Patent
Lynch et al.

(10) Patent No.: US 7,509,115 B2
(45) Date of Patent: Mar. 24, 2009

(54) ENSURING EAS PERFORMANCE IN AUDIO SIGNAL ENCODING

(75) Inventors: Wendell D. Lynch, Silver Spring, MD (US); James M. Jensen, Columbia, MD (US)

(73) Assignee: Arbitron, Inc.

( * ) Notice: Subject to any disclaimer, the term of this patent is extended or adjusted under 35 U.S.C. 154(b) by 160 days.

(21) Appl. No.: 11/638,262

(22) Filed: Dec. 13, 2006

(65) Prior Publication Data

US 2007/0178926 A1 Aug. 2, 2007

Related U.S. Application Data

(63) Continuation of application No. 10/328,199, filed on Dec. 23, 2002, now Pat. No. 7,174,151.

(51) Int. Cl.
*H04M 11/04* (2006.01)
*G08B 1/08* (2006.01)
*G08B 5/22* (2006.01)

(52) U.S. Cl. .............................. 455/404.1; 340/539.28; 340/7.5; 379/37

(58) Field of Classification Search .............. 455/404.1, 455/4.2, 45, 6.1, 5.1, 6.2, 6.3, 186.1, 46, 455/2, 3.2, 161.1, 161.3, 227–228, 3.01, 455/3.02; 340/539.1, 7.5, 691.3, 539.28, 340/7.4, 37, 531, 534, 601; 725/53, 33; 702/2; 342/26 R; 379/37; 348/1, 5–7, 12, 13; 701/1, 701/36; 375/272
See application file for complete search history.

(56) References Cited

U.S. PATENT DOCUMENTS

| | | | | |
|---|---|---|---|---|
| 5,319,735 | A | 6/1994 | Preuss et al. | |
| 5,450,490 | A | 9/1995 | Jensen et al. | |
| 5,574,962 | A | 11/1996 | Fardeau et al. | |
| 5,579,124 | A | 11/1996 | Aijala et al. | |
| 5,581,800 | A | 12/1996 | Fardeau et al. | |
| 5,764,763 | A | 6/1998 | Jensen et al. | |
| 5,787,334 | A | 7/1998 | Fardeau et al. | |
| 5,828,325 | A | 10/1998 | Wolosewicz et al. | |
| 5,945,932 | A | 8/1999 | Smith et al. | |
| 6,154,484 | A | 11/2000 | Lee et al. | |
| 6,175,627 | B1 | 1/2001 | Petrovic et al. | |
| 6,845,360 | B2 | 1/2005 | Jensen | |
| 6,862,355 | B2 | 3/2005 | Kolessar | |
| 6,871,180 | B1 | 3/2005 | Neuhauser | |
| 7,174,151 | B2 * | 2/2007 | Lynch et al. ............. | 455/404.1 |

FOREIGN PATENT DOCUMENTS

| | | |
|---|---|---|
| WO | WO 96/27264 | 9/1996 |
| WO | WO 98/26529 | 6/1998 |
| WO | WO 99/592275 | 11/1999 |

* cited by examiner

*Primary Examiner*—Melody Mehrpour
(74) *Attorney, Agent, or Firm*—Katten Muchin Rosenman

(57) ABSTRACT

An encoding system for encoding a first ancillary code in media data and monitoring for reception of a second ancillary code that has a higher priority than the first ancillary code, such that upon detection of the higher priority ancillary code the encoding system modifies a characteristic and/or characteristics of the first ancillary code.

58 Claims, 8 Drawing Sheets

ENSURING EAS PERFORMANCE IN AUDIO SIGNAL ENCODING

CROSS-REFERENCE TO RELATED APPLICATION

This application is a continuation of prior U.S. non-provisional patent application Ser. No. 10/328,199, filed Dec. 23, 2002 now U.S. Pat. No. 7,174,151, assigned to the assignee of the present invention and hereby incorporated herein by reference in its entirety.

FIELD OF THE INVENTION

This present invention concerns methods and systems for encoding an ancillary code in media data, such as audio data, while avoiding interference with a higher priority ancillary code therein.

BACKGROUND OF THE INVENTION

In the United States, the Emergency Alert System ("EAS") replaced the older Emergency Broadcast System in January 1997. The EAS allows the President of the United States of America, or one of his representatives, to address the Nation during national emergency situations. EAS places the Nation's broadcast and cable industries at the President's disposal for addressing the Nation. The Federal Communications Commission ("FCC"), along with the National Weather Service ("NWS") and the Federal Emergency Management Agency ("FEMA"), implement EAS.

EAS utilizes Audio Frequency Shift Keying ("AFSK") to send a data signal on a broadcast station's main audio channel. Weekly tests of the AFSK, and monthly on-air tests for television and radio stations are performed by EAS. The utilization of AFSK allows EAS to send data to unattended stations. The EAS equipment receives a message, interrupts a station's regular programming, sends the alert warning, and then automatically returns the station to normal programming.

There is also a large interest in identifying and/or measuring audience exposure to audio data in order to provide market information to, for instance, advertisers and media distributors, for any purpose for which an estimation of audience receipt or exposure is desired.

One technique utilized for audience measurement involves adding an ancillary code to the audio data for use in producing audience estimates. An encoder is typically utilized by the radio station, broadcast TV station or cable location to insert an inaudible code into the audio spectrum of the media source. These signals are then received and decoded at the audience location to uniquely identify the program signal.

However, when an EAS signal passes through such an encoder, the characteristics of the EAS signal may be modified. The modified EAS signal may not operate properly with the studio broadcast equipment. A typically improper operation could be, for instance, the studio control equipment failing to detect and activate in response to an EAS signal, or the studio control equipment failing to turn off from EAS mode once the EAS broadcast has been completed.

As the EAS is maintained for use in national emergency situations, it is vital that nothing interfere with the EAS broadcast transmission.

However, it is also very important to advertisers and media distributors that they receive comprehensive audience measurement information. Therefore, any interruption in the identification of a program signal that an audience is exposed to should be minimized.

Therefore, what is desired is to provide an encoding system that will not interfere with the effective detection of an EAS code and/or another higher priority code.

It is further desired to provide an encoding system that will minimize any interruption in audience measurement after an EAS code or another higher priority code is detected.

It is further desired to provide an encoding system that will reliably ensure that the audience measurement system will continue to function after the cessation of the EAS code or other higher priority code.

SUMMARY OF THE INVENTION

For this application, the following terms and definitions shall apply, both for the singular and plural forms of nouns and for all verb tenses:

The term "data" as used herein means any indicia, signals, marks, domains, symbols, symbol sets, representations, and any other physical form or forms representing information, whether permanent or temporary, whether visible, audible, acoustic, electric, magnetic, electromagnetic, or otherwise manifested. The term "data" as used to represent certain information in one physical form shall be deemed to encompass any and all representations of the same information in a different physical form or forms.

The term "media data" as used herein means data which is widely accessible, whether over-the-air, or via cable, satellite, network, internetwork (including the Internet), distributed on storage media, or otherwise, without regard to the form or content thereof, and including but not limited to audio, video, text, images, animations, web pages and streaming media data.

The term "audio data" as used herein means any data representing acoustic energy, including, but not limited to, audible sounds, regardless of the presence of any other data, or lack thereof, which accompanies, is appended to, is superimposed on, or is otherwise transmitted or able to be transmitted with the audio data.

The term "network" as used herein means networks of all kinds, including both intra-networks, such as a single-office network of computers, and inter-networks, such as the Internet, and is not limited to any particular such network.

The terms "audience" and "audience member" as used herein mean a person or persons, as the case may be, who access media data in any manner, whether alone or in one or more groups, whether in the same or various places, and whether at the same time or at various different times.

The terms "communicate" and "communicating" as used herein include both conveying data from a source to a destination, as well as delivering data to a communications medium, system or link to be conveyed to a destination. The term "communication" as used herein means the act of communicating or the data communicated, as appropriate.

The terms "coupled", "coupled to", and "coupled with" as used herein each mean a relationship between or among two or more devices, apparatus, files, programs, media, components, networks, systems, subsystems, and/or means, constituting any one or more of (a) a connection, whether direct or through one or more other devices, apparatus, files, programs, media, components, networks, systems, subsystems, or means, (b) a communications relationship, whether direct or through one or more other devices, apparatus, files, programs, media, components, networks, systems, subsystems, or means, or (c) a functional relationship in which the operation of any one or more of the relevant devices, apparatus, files, programs, media, components, networks, systems, subsystems, or means depends, in whole or in part, on the operation of any one or more others thereof.

In accordance with an aspect of the present invention a method is provided for encoding an ancillary code in broadcast audio data while preserving detectability of an Emergency Alert System (EAS) code contained therein. The method comprises the steps of: receiving broadcast audio data; encoding the broadcast audio data with an ancillary code having a first magnitude; providing reference data corresponding to an EAS code; monitoring for an EAS code by comparing the reference data with at least a portion of the broadcast audio data, to produce a match of the reference data with an EAS code present in the broadcast audio data; and reducing the first magnitude of the ancillary code in response to the match, such that detectability of the EAS code in the broadcast audio data in accordance with a predetermined detection method is preserved.

In accordance with another aspect of the present invention a method is provided for encoding an ancillary code in media data. The method comprises the steps of: receiving the media data; encoding the media data with a first ancillary code having predetermined code characteristics and a first code detection priority; providing reference data corresponding to a second ancillary code having a second code detection priority higher than the first code detection priority and present from time to time in the media data; comparing the reference data with at least a portion of the media data, to produce a match of the reference data with the second ancillary code when present therein; and modifying at least one of the predetermined characteristics of the first ancillary code in response to the match, to ensure detectability of the second ancillary code in the media data in accordance with a predetermined detection method.

In accordance with yet another aspect of the present invention a method is provided for encoding an ancillary code in media data. The method comprises the steps of: receiving the media data; encoding the media data with a first ancillary code having predetermined code characteristics and a first code detection priority; detecting a second ancillary code in or to be included in the media data to produce detection data, the second ancillary code having a second code detection priority higher than the first code detection priority; and modifying at least one of the predetermined characteristics of the first ancillary code for a predetermined time period in response to the detection data, to ensure detectability of the second ancillary code in the media data during the predetermined time period in accordance with a predetermined detection method.

In accordance with still another aspect of the present invention a method is provided for encoding an ancillary code in media data. The method comprises the steps of: receiving the media data; encoding the media data with a first ancillary code having predetermined code characteristics and a first code detection priority; detecting an a second ancillary code in or to be included in the media data to produce detection data, the second ancillary code having a second code detection priority higher than the first code detection priority; and modifying at least one of the predetermined characteristics of the first ancillary code in response to the detection data, to ensure detectability of the second ancillary code in the media data in accordance with a predetermined detection method.

In accordance with a further aspect of the present invention a system is provided for encoding an ancillary code in broadcast audio data while preserving detectability of an Emergency Alert System (EAS) code contained therein. The system comprises: an encoder for encoding broadcast audio data with an ancillary code having a first magnitude; reference data corresponding to an EAS code; and a controller for monitoring for an EAS code by comparing the reference data with at least a portion of the broadcast audio data, to produce a match of the reference data with an EAS code present in the broadcast audio data and for reducing the first magnitude of the ancillary code in response to the match, such that detectability of the EAS code in the broadcast audio data in accordance with a predetermined detection method is preserved.

In accordance with a still further aspect of the present invention a system is provided for encoding an ancillary code in media data. The system comprises: an encoder for encoding media data with a first ancillary code having predetermined code characteristics and a first code detection priority; reference data corresponding to a second ancillary code having a second code detection priority higher than the first code detection priority and present from time to time in the media data; a controller for comparing the reference data with at least a portion of the media data, to produce a match of the reference data with the second ancillary code when present therein and for modifying at least one of the predetermined code characteristics of the first ancillary code in response to the match, to ensure detectability of the second ancillary code in the media data in accordance with a predetermined detection method.

In accordance with yet another aspect of the present invention a system is provided for encoding an ancillary code in media data. The system comprises: an encoder for encoding media data with a first ancillary code having predetermined code characteristics and a first code detection priority; and a controller for detecting a second ancillary code in or to be included in the media data to produce detection data, the second ancillary code having predetermined code characteristics and a second code detection priority higher than the first code detection priority, the controller being operative to modify at least one of the predetermined characteristics of the first ancillary code for a predetermined time period in response to the detection data, to ensure detectability of the second ancillary code in the media data during the predetermined time period in accordance with a predetermined detection method.

In accordance with yet still another aspect of the present invention a system is provided for encoding an ancillary code in media data. The system comprises: an encoder for encoding media data with a first ancillary code having predetermined code characteristics and a first code detection priority; and a controller for detecting an instance of a second ancillary code in or to be included in the media data to produce detection data, the second ancillary code having predetermined code characteristics and a second code detection priority higher than the first code detection priority, the controller being operative to modify at least one of the predetermined characteristics of the first ancillary code in response to the detection data, to ensure detectability of the second ancillary code in the media data in accordance with a predetermined detection method.

The invention and its particular features and advantages will become more apparent from the following detailed description considered with reference to the accompanying drawings, in which the same elements depicted in different drawing figures are assigned the same reference numerals.

DETAILED DESCRIPTION OF THE CERTAIN ADVANTAGEOUS EMBODIMENTS

Figure 1:
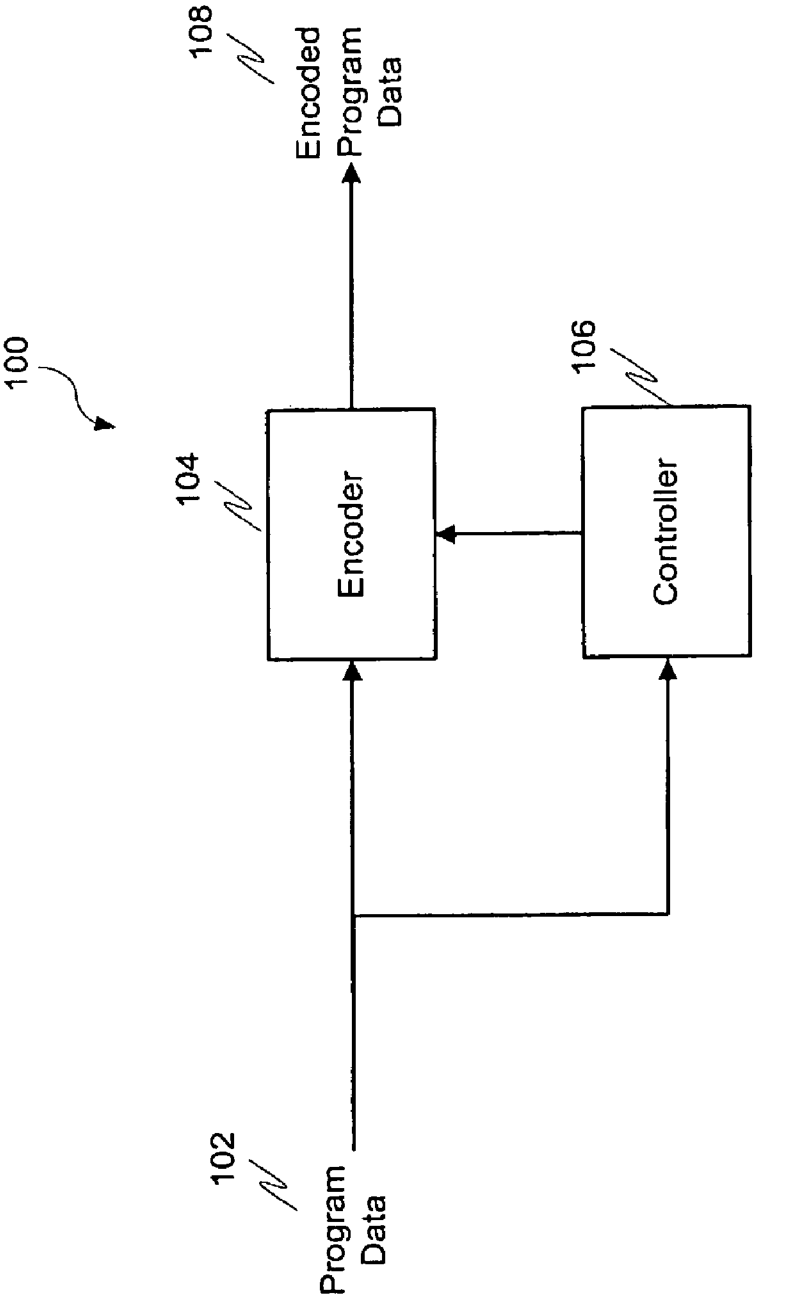
FIG. 1 is a functional block diagram for use in illustrating systems and methods for encoding an ancillary code in media data in accordance with certain embodiments of the invention.

FIG. 1 is an overview of encoding processes and systems 100 in accordance with certain embodiments of the invention. The systems and processes of FIG. 1 in certain embodiments serve to encode program data for estimating exposure of audience members to media data, such as broadcasts. In other embodiments, the systems and processes are used to encode media data for use in determining whether commercials have been aired properly, determining whether network affiliates have broadcast network programs according to the network schedule, detecting illegal copies of copyrighted works, and the like. The encoding system 100 comprises an encoder 104 and a controller 106. Encoder 104 and controller 106 each receive program data 102. Encoder 104 serves to encode program data with an ancillary code and communicates the encoded program data 108 for transmission, recording or other utilization or processing. Controller 106 is coupled to encoder 104 to exercise control over its encoding operations, as explained hereinbelow.

Program data 102 may take the form of any kind or combination of media data, for instance, but not limited to, audio, video and/or text data and can be in a compressed or uncompressed format. The program data 102 may also be previously encoded or unencoded. In the case of audio data, program data 102 may be represented in the time domain or the frequency domain. Program data 102 may also comprise any combination of the foregoing data forms.

As noted above, program data 102 is fed into encoder 104. For acoustic signals, encoder 104 may utilize any encoding technique suitable for encoding audio signals that are reproduced as acoustic energy, such as, for example, the techniques disclosed in U.S. Pat. No. 5,764,763 to Jensen, et al., and modifications thereto, which is assigned to the assignee of the present invention and which is incorporated herein by reference. Other appropriate encoding techniques are disclosed in U.S. Pat. No. 5,579,124 to Aijala, et al., U.S. Pat. Nos. 5,574,962, 5,581,800 and 5,787,334 to Fardeau, et al., U.S. Pat. No. 5,450,490 to Jensen, et al., U.S. patent application Ser. No. 09/318,045, in the names of Neuhauser, et al. filed May 25, 1999, U.S. patent application Ser. No. 09/948,283 in the names of Kolessar, et al. filed Sep. 7, 2001, and U.S. patent Application Ser. No. 10/302,309 filed Nov. 22, 2002 in the names of Jensen, et al., each of which is assigned to the assignee of the present application and all of which are incorporated herein by reference.

Still other suitable encoding techniques are the subject of PCT Publication WO 00/04662 to Srinivasan, U.S. Pat. No. 5,319,735 to Preuss, et al., U.S. Pat. No. 6,175,627 to Petrovich, et al., U.S. Pat. No. 5,828,325 to Wolosewicz, et al., U.S. Pat. No. 6,154,484 to Lee, et al., U.S. Pat. No. 5,945,932 to Smith, et al., PCT Publication WO 99/59275 to Lu, et al., PCT Publication WO 98/26529 to Lu, et al., and PCT Publication WO 96/27264 to Lu, et al, all of which are incorporated herein by reference.

In one particular mode of operation, encoder 104 encodes program data 102 with multiple messages that share substantially single-frequency components. In another mode of operation, program data 102 already has a message encoded therein and encoder 104 encodes one or more additional messages in program data 102. In a further mode of operation, encoder 104 encodes a message in program data 102 which has not previously been encoded. Encoded data 108 may then be communicated in any suitable form or by any appropriate technique, such as radio broadcasts, television broadcasts, DVDs, MP3s, compact discs, streaming music, streaming video, network data, mini-discs, multimedia presentations, files, attachments, VHS tapes, personal address systems or the like.

For purposes of clarity, we will refer to the ancillary code added to program data 102 by encoder 106 as the first ancillary code, and the ancillary code detected in program data 102 by controller 106 as the second ancillary code. Referring to ancillary codes as "first" or "second" is not meant to be limiting as to any particular order, magnitude, priority or any characteristic or parameter of the codes, but is simply to used differentiate one from another. The second ancillary code has a higher signal priority than the first ancillary code.

In addition to encoder 104, program data 102 is fed into controller 106. Controller 106 monitors program data 102 for the presence of a second ancillary code. The second ancillary code has certain signal characteristics and parameters. In the event that the second ancillary code is detected in program data 102, controller 106 adjusts one of the parameters of the first ancillary code added to the program data 102 by encoder 104, which may be for instance, the energy level, so that detectability of the second ancillary code in accordance with a predetermined detection method is preserved.

In one particular embodiment, the second ancillary code comprises an Emergency Alert System (EAS) code. Presently the EAS code utilizes a four-part message for an emergency activation of the EAS. The four parts comprise; Preamble and EAS Header Codes, audio Attention Signal, the EAS message, and Preamble and EAS End of Message Codes. The Preamble and EAS Codes must use Audio Frequency Shift Keying at a rate of 520.83 bits per second to transmit the codes. Mark frequency is 2083.3 Hz and space frequency is 1562.5 Hz. Mark and space time must be 1.92 milliseconds. Characters are ASCII seven bit characters as defined in ANSI X3.4-1977 ending with an eighth null bit to constitute a full eight-bit byte. The Attention Signal includes of two simultaneously transmitted tones at 853 and 960 Hz respectively, while the EAS message may comprise audio, video or text.

Figure 2:
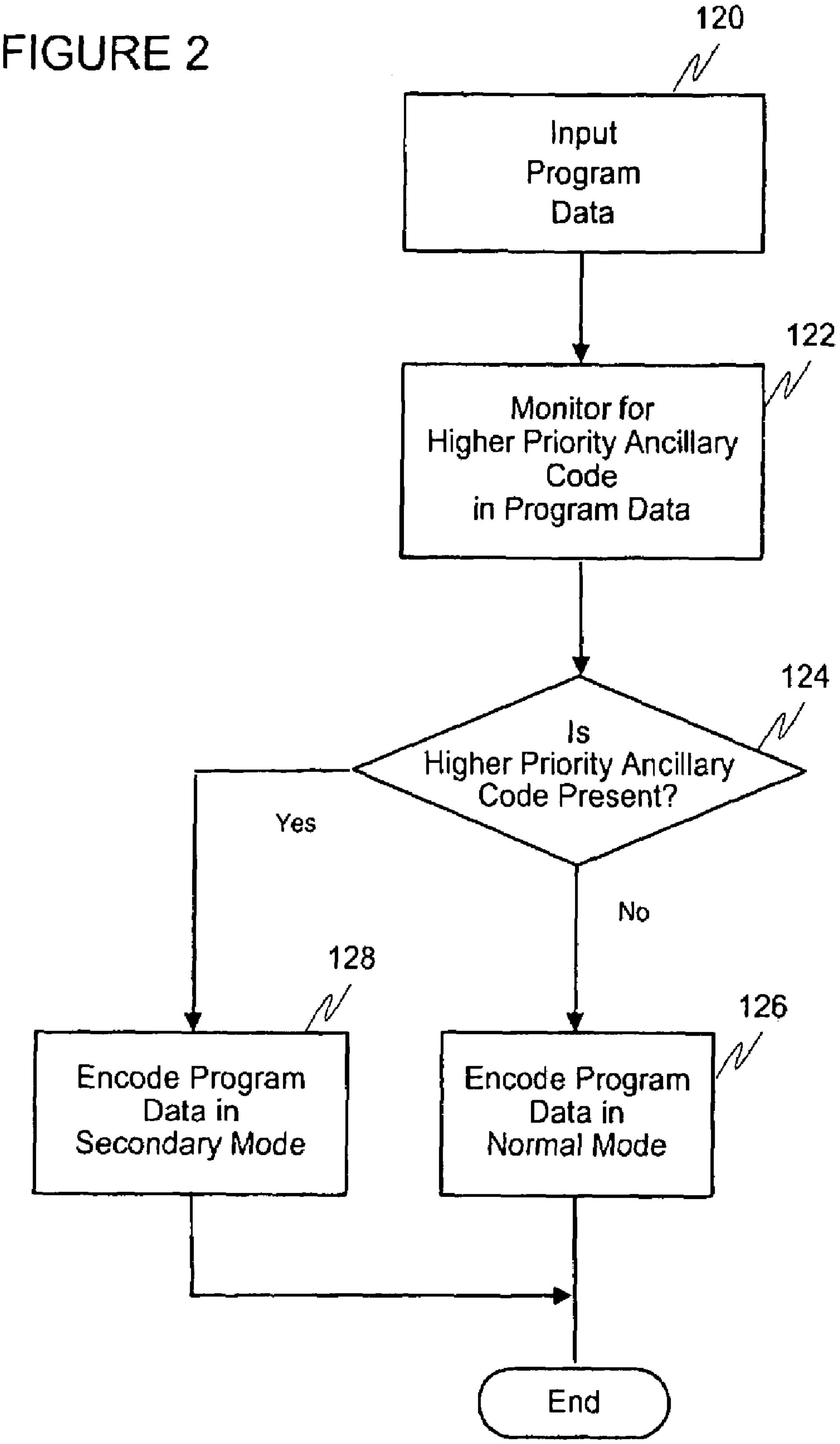
FIG. 2 is a flow diagram for use in explaining an operating mode of the systems and methods of FIG. 1.

FIG. 2 is a flow diagram illustrating certain operations of encoding system 100 of FIG. 1.

As discussed hereinabove, program data 102 is fed into controller 106, which is represented in the first step of FIG. 2 as input program data 120. The program data may take the form of any of the previously discussed program signal forms.

The next step is to monitor for a higher priority ancillary code in program data 122. That is, the encoding system 100 monitors for a second ancillary code having predetermined code characteristics. The encoding system 100 then determines if a higher priority ancillary code is present 124. If a higher priority ancillary code is not present, the encoding system 100 continues to encode program data in normal mode 126. However, if a higher priority ancillary code is found to be present, the controller 106 will control the encoder 104 to encode program data in a secondary mode 128. Again as discussed above, at least one of the parameters of the first ancillary code is adjusted in the secondary mode, which may be for instance, the encoding energy level or levels in order to preserve detectability of the second ancillary code in accordance with a predetermined method despite any modifications or additions to the program data 102 by encoder 104 operating in the secondary mode. In certain embodiments, other characteristics of the first ancillary code are modified for this purpose, such as encoding frequencies or method (for example, spread spectrum encoding, FSK, etc.)

Figure 3:
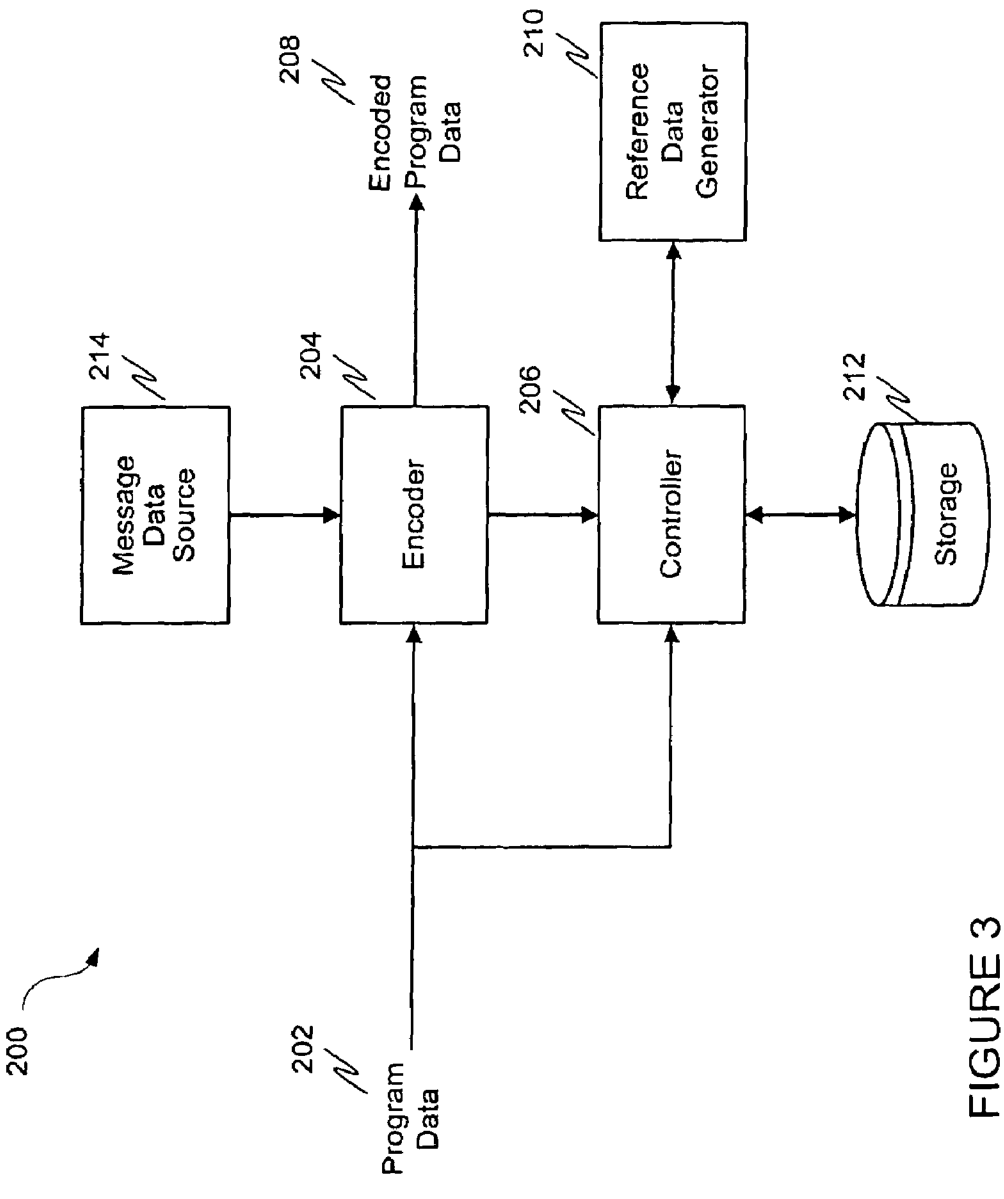
FIG. 3 is a functional block diagram illustrating an embodiment of the present invention.

FIG. 3 is a functional block diagram of an encoding system 200 according to one advantageous embodiment of the invention. Program data 202 may take any form as discussed above in connection with FIG. 1 and FIG. 2. In addition, the above-referenced encoding techniques, interface devices, and EAS code information are also applicable to the system 200 of FIG. 3.

Program data 202 is fed into an encoder 204 where a first ancillary code is added to program data 202, generating encoded program data 208. In addition, program data 202 is fed to controller 206, which monitors program data 202 for the presence of a second ancillary code. An internal reference data generator 210 generates reference data corresponding to the second ancillary code and is coupled to controller 206 to provide the reference data thereto. Also coupled to controller 206 is storage 212, for storing the reference data.

Based upon the reference data generated by internal reference data generator 210, controller 206 monitors program data 202 for a match of the reference data with the secondary ancillary code present in the program data 202. In certain embodiments, a separate reference data generator 210 is not included, but rather controller 206 merely accesses the reference data from storage 212. In further embodiments, the reference data is either hardwired into controller 206 or retained in a storage device forming a part thereof, so that neither an internal reference generator nor a storage is required apart from controller 206. In the case of monitoring for an EAS code, controller 206 monitors program data 202 for the first preamble and second preamble of the EAS code. As described above, the first preamble of the EAS code indicates that an EAS message is to follow, while the second preamble of the EAS code indicates completion of the EAS message. When either the first or second preamble is detected, the encoder is placed in the secondary mode of operation.

To determine whether an EAS code has been received, controller 206 compares data points and the energy level of the data points of the program data 202 to the reference data to generate a correlation value. The data points may include for instance, reference frequencies for each frequency used in the EAS code preambles. In addition, the signal amplitudes for these various frequencies are matched against a threshold level to further ensure a positive identification of an EAS code prior to alteration and/or interruption of the first ancillary code.

Message data source 214 is connected to encoder 204 and may comprise any source of data for the first ancillary code. For instance, message data source 214 may be a database or data located internally or externally to encoder 204. In addition, message data source 214 may comprise any remotely located data source, which may be connected via a network, including for instance, but not limited to, a Local Area Network (LAN), a Wide Area Network (WAN) or the Internet. Message data source 214 provides encoder 204 with the necessary information, such as message identifiers, message symbols, symbol sequences, predetermined code parameters and/or predetermined code characteristics, to encode program data 202 with the first ancillary code. In certain embodiments message data source 214 is incorporated in encoder 204.

Figure 4:
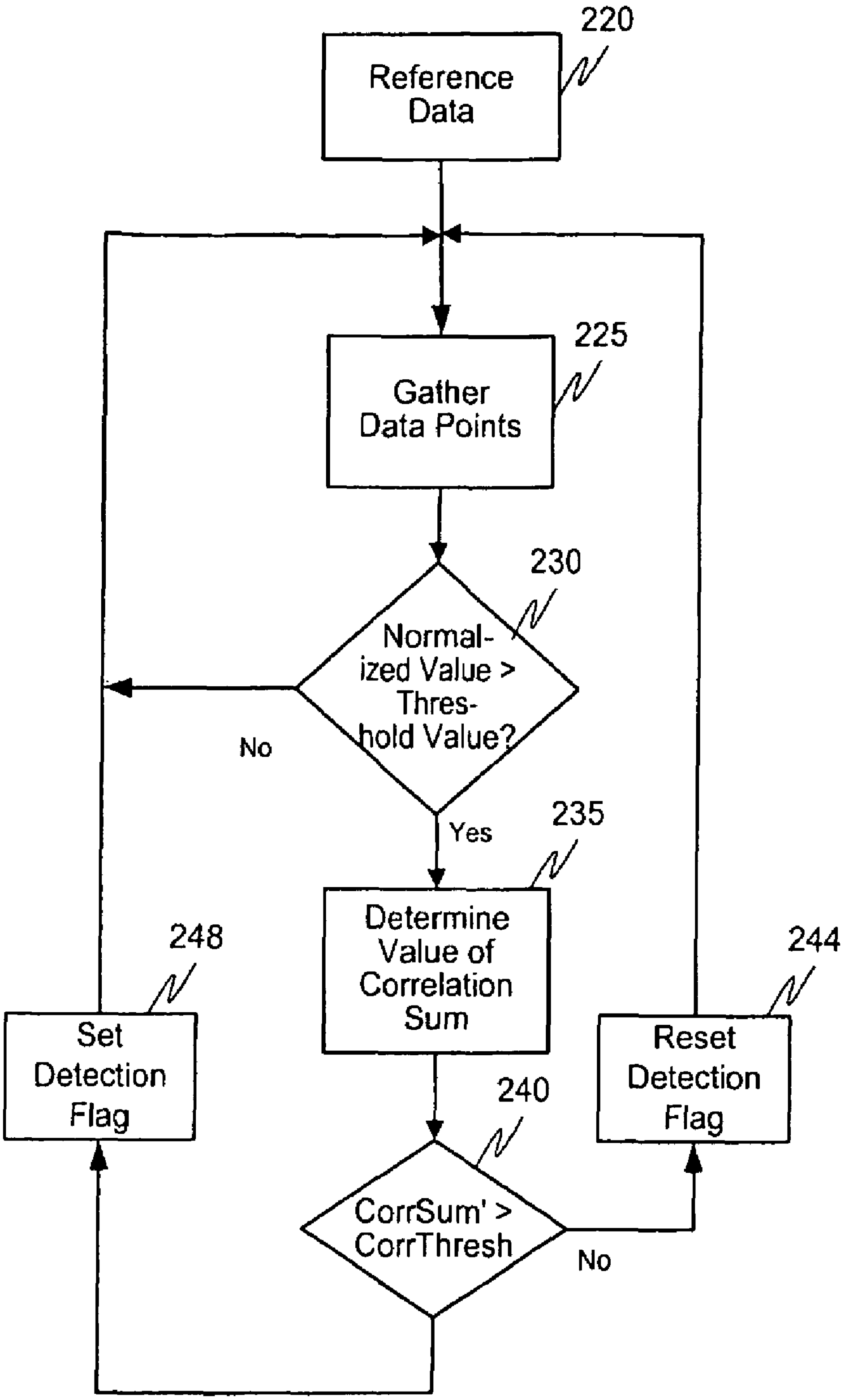
FIGS. 4 and 4A are flow diagrams for use in explaining certain operating modes of the systems and methods of FIG. 3.

FIG. 4 is a flow diagram illustrating certain operations of the system as depicted in FIG. 3. The following process serves to identify the presence of an EAS code in program data 202.

Figure 5:
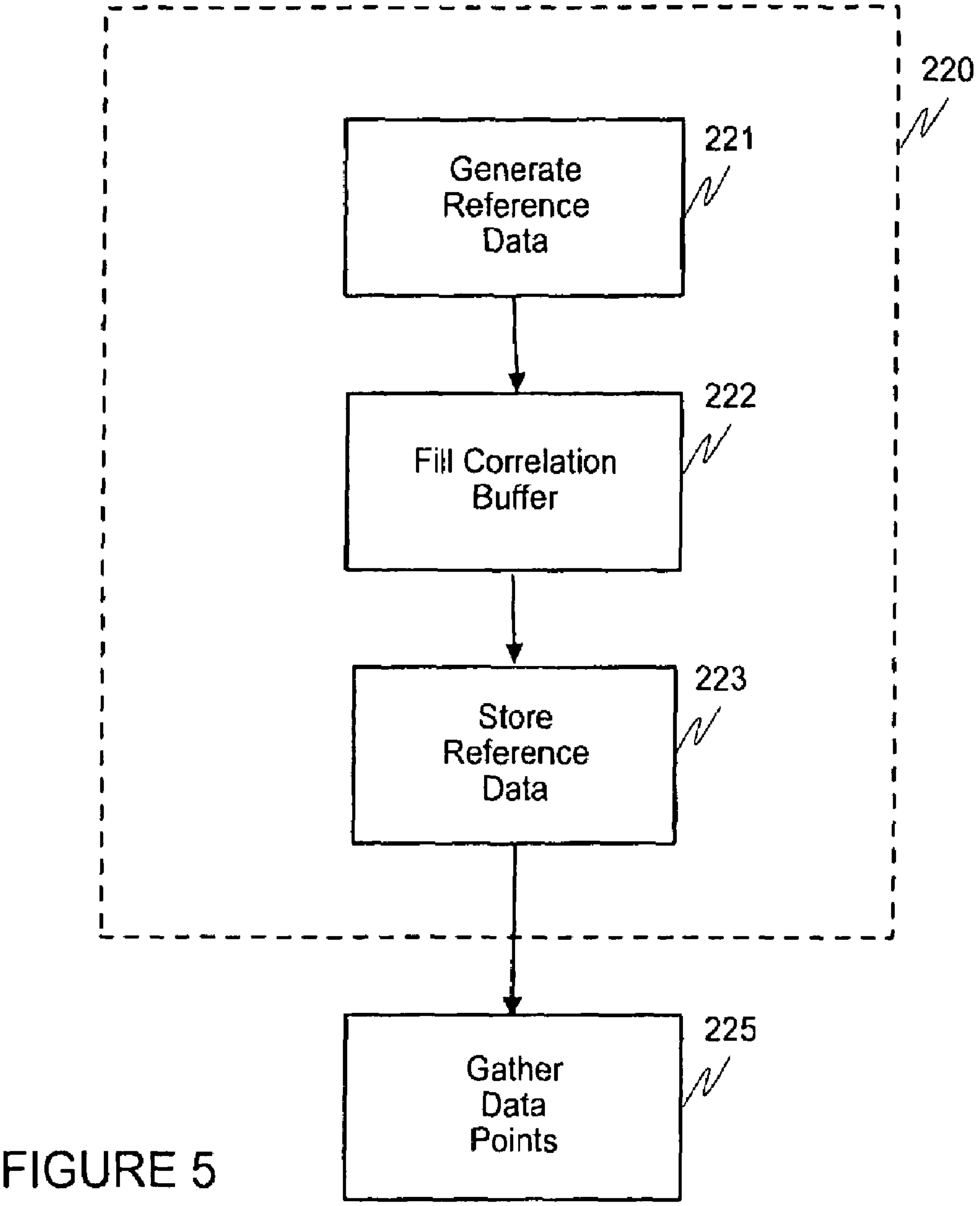
FIG. 5 is a flow diagram illustrating certain steps of FIG. 4 in greater detail.

According to the operations illustrated in FIG. 4, first reference data 220 is generated. Referring also to FIG. 5, which illustrates this in greater detail, the first step is to generate reference data 221. Once the reference data is generated, the system fills a correlation buffer 222 to carry out a correlation process in which the reference data is self-correlated to produce an ideal correlation value, which is then multiplied by a factor less than 1.0 to produce a correlation threshold value, CorrThresh. In certain embodiments, the factor is selected as 0.5, but different values are employed in other embodiments. The system also stores the reference data 223 for later use. In certain embodiments, the reference data provides a waveform of the code to be detected. The reference data in certain embodiments constitute a recording of the code to be detected, such as an EAS code preamble. In certain embodiments, the reference data serves to control the reference data generator 210 to produce a replica of the code to be detected. In certain variants of the foregoing embodiments, the reference data is loaded to the correlation buffer, but is not otherwise stored. In other variants, the reference data is read from storage to the correlation buffer, without the need to generate it or otherwise store it.

Figure 6:
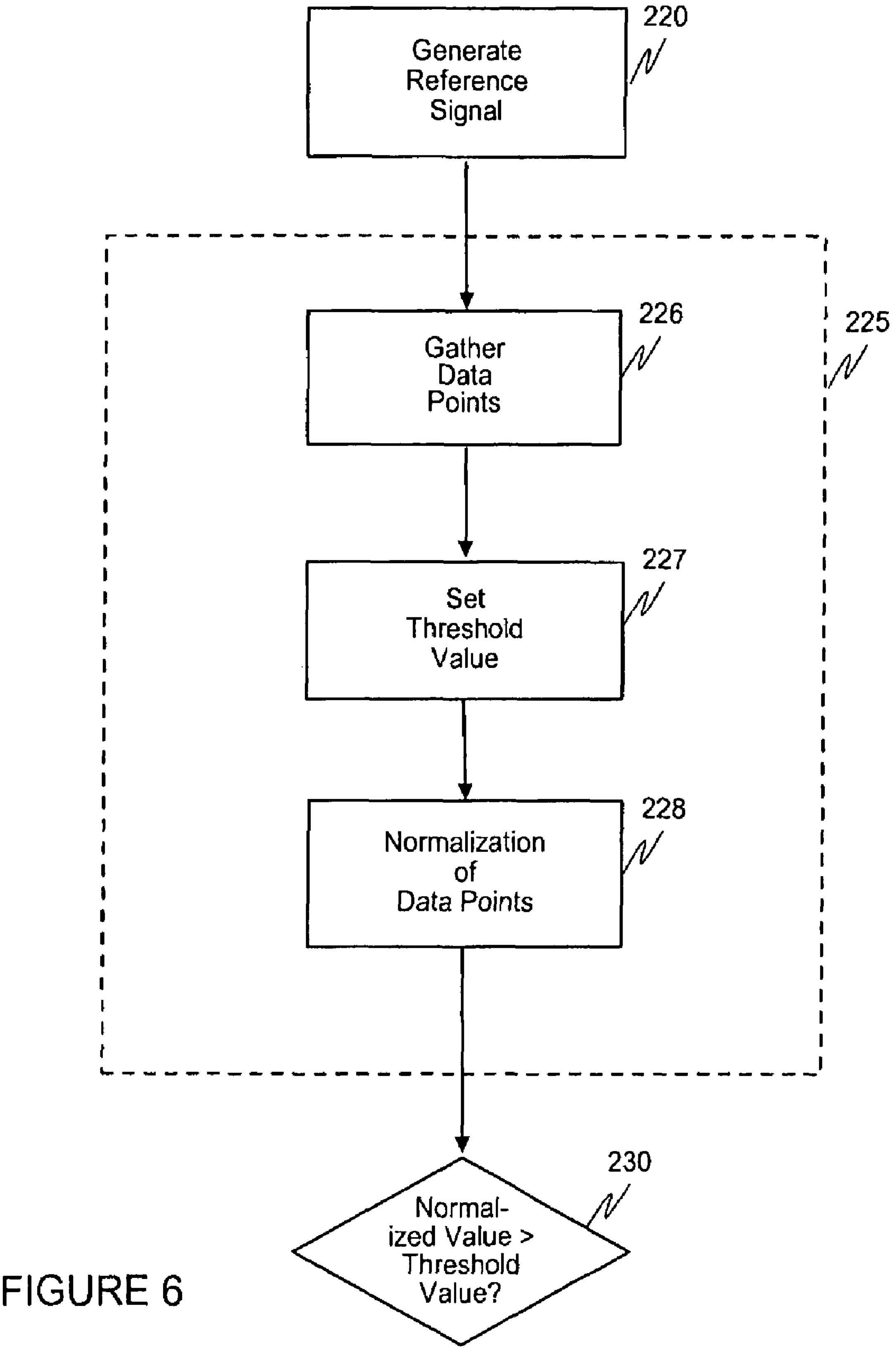
FIG. 6 is a flow diagram illustrating certain steps of FIG. 4 in greater detail.

Referring again to FIG. 4, the next step is to gather data points 225. Referring also to FIG. 6, which illustrates this process in greater detail, first the system gathers data points 226. Next, the system selects or sets a threshold value for conducting an initial screening of the data points 227. In certain embodiments, the threshold value is predetermined. Then the gathered data points are normalized 228.

Figure 7:
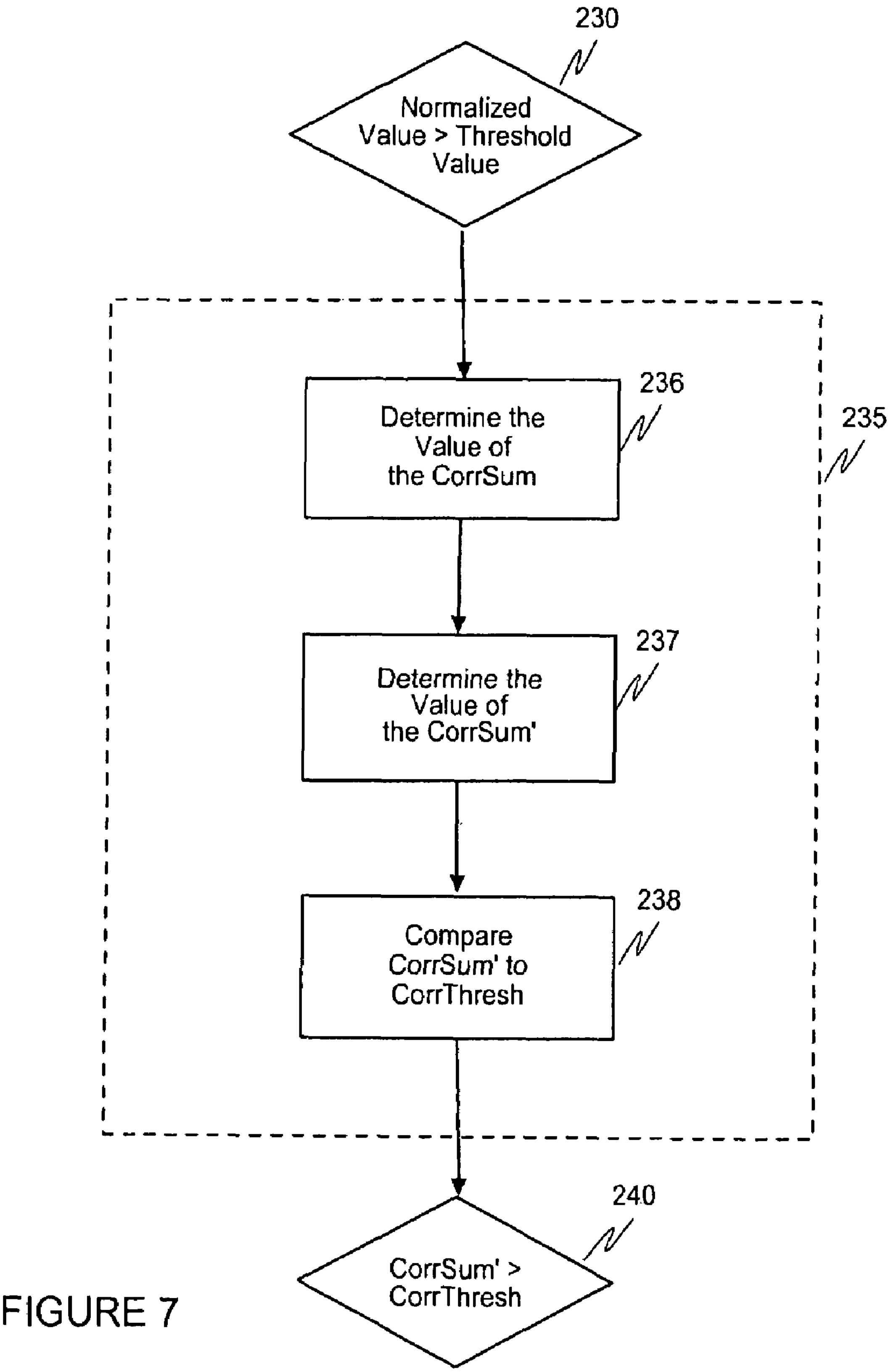
FIG. 7 is a flow diagram illustrating certain steps of FIG. 4 in greater detail.

Referring back to FIG. 4, the next step is to determine if the normalized value of the gathered data points is greater than the threshold value 230. If the normalized value is not greater than the threshold value, the system will cycle back to gather additional data points 225. However, if the normalized value is greater than the threshold value, this indicates the potential presence of the code and the system will proceed to determine the value of the correlation sum (CorrSum) 235. Comparing the gathered data points to a threshold value to evaluate whether the energy level of the gathered points is at least above a minimum value will help ensure that false detections of the codes do not take place, thereby minimizing any interruptions in the encoding process.

Where the normalized value exceeds the threshold value, the next step is to determine the value of the correlation sum 235. Referring to FIG. 7, which illustrates this process in greater detail, first the system determines the value of the CorrSum 236. The CorrSum is determined by correlating the gathered data points to the reference data. The next step is to determine the value of the CorrSum' 237. This is accomplished by dividing the CorrSum by a maximum value of the gathered data points.

Referring back to FIG. 4, the next step is to determine if CorrSum' is greater than CorrThresh. If CorrSum' is not greater than CorrThresh, then a detection flag indicating detection of the code being monitored is reset 244 and the system cycles back to gather data points 225, repeating the above process. If however, CorrSum' is greater than CorrThresh, then a higher priority ancillary code has been received and the detection flag is set. The system continues to gather data points 225 in order to continue monitoring for the code. Therefore, to confirm a hit of a higher priority ancillary code, the gathered data points must first be above a predetermined the threshold value and must also yield a correlation value exceeding CorrThresh. This will help to ensure that false detections will not cause unnecessary interruptions of the encoding system.

Figure 4A:
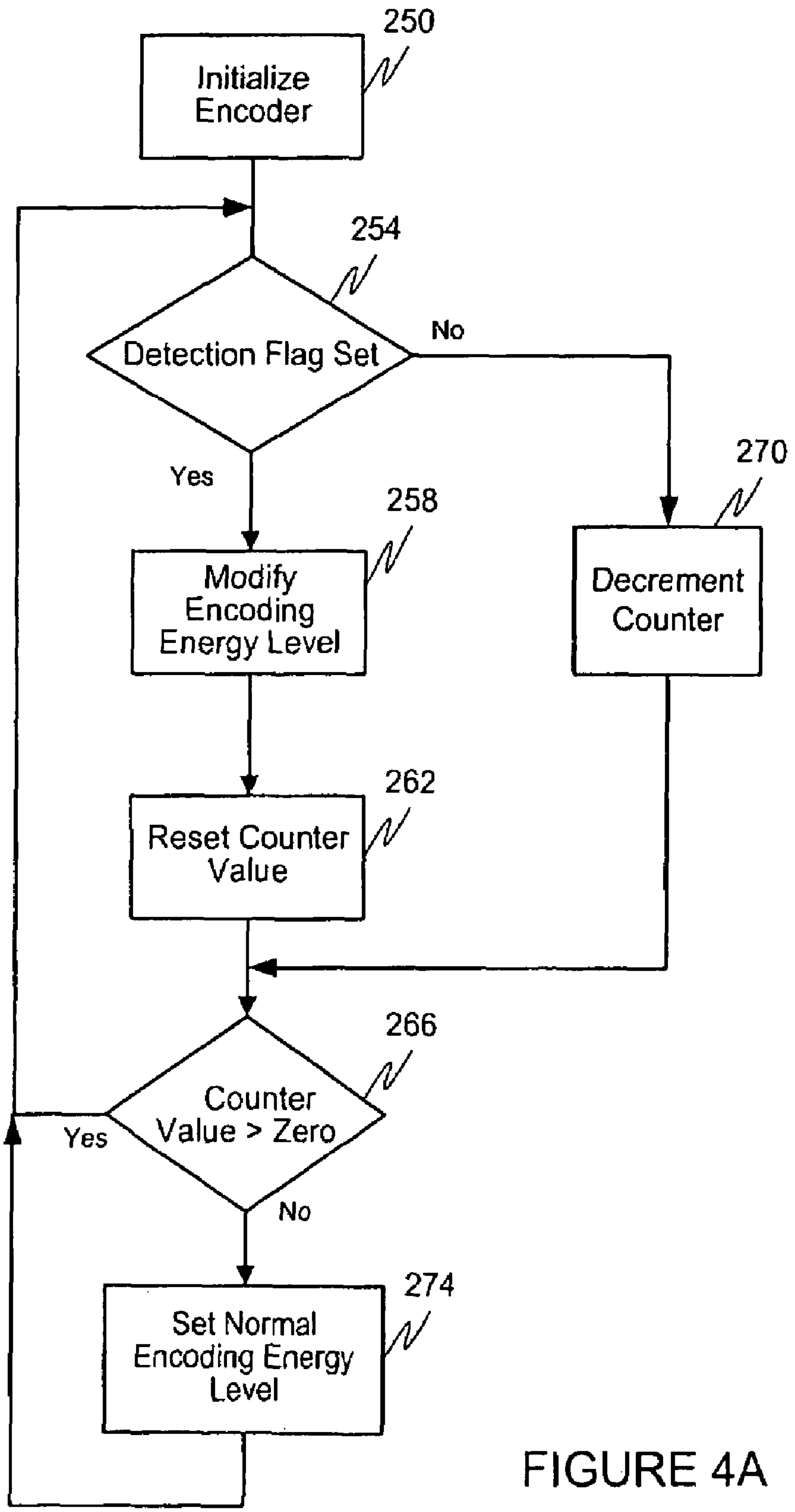

With reference now to FIG. 4A, the encoder 204 is initialized 250 to encode the program data at a normal encoding energy level. Then the detection flag is examined 254 to determine if it has been set in step 248 of the FIG. 4 process. If so, the energy level of the code inserted by the encoder 204 is modified 258 to avoid interference with detection of the higher-level code, and a counter value is reset to 262 to a predetermined positive value. In a step 266 the counter the value is tested to determine if it is greater than zero, and if so, the system returns to step 254 to test the detection flag once again.

Once the detection flag has been reset indicating that a higher-level code is no longer present in the program data, in a stepped 270 the counter is decremented. So long as the code is not detected the system periodically decrements the counter 270 and tests its value 266 to determine whether it is less than or equal to zero. Once this occurs, the encoder is reset to recommence encoding at the normal encoding energy level 274. The next step is to modify the encoding energy level of the first ancillary code added to the program data 250. Although in this particular embodiment the energy level of the first ancillary code is modified, any one or any number of the characteristics of the first ancillary code may be selected for modification. Where the purpose is to avoid interference with detection of an EAS code the level of the first ancillary code may be reduced to zero or to a relatively smaller non-zero level.

In order to ensure that the first ancillary code is encoded in its modified form for a predetermined time after detection of the second ancillary code has ceased, a predetermined counter value is reset after each such detection 255. The counter value is decremented once during each preset time interval (e.g., every 2 msec), so that if it is not reset, the counter value reaches zero after such predetermined time. The first ancillary code is included in its modified form in the audio signal so long as the second ancillary code is detected and thereafter until the counter value is decremented to zero.

It is beneficial to provide a counter rather than wait to receive the finish or stop event from the higher priority ancillary code because stop event problems are eliminated. For instance, if the system should determine the reception of a higher priority ancillary code and modify a characteristic(s) of the first ancillary code accordingly, but then fail to detect the stop code for the higher priority ancillary code, the encoding system may continue in an interrupted state for an extended length of time unnecessarily. Therefore, with the present system, the characteristic(s) of the first ancillary code will be modified while receipt of the higher priority ancillary code is detected, but once the higher priority ancillary code is no longer detected, the system will simply count down the counter value, which once elapsed, will restore the characteristic(s) of the first ancillary code back to normal levels.

Although the invention has been described with reference to particular arrangements and embodiments of services, systems, processors, devices, features and the like, these are not intended to exhaust all possible arrangements or embodiments, and indeed many other modifications and variations will be ascertainable to those of skill in the art.

What is claimed is:

1. A method of encoding an ancillary code in broadcast audio data while preserving detectability of an Emergency Alert System (EAS) code therein, comprising the steps of:
- receiving broadcast audio data;
- encoding the broadcast audio data with an ancillary code having a first magnitude;
- providing reference data corresponding to an EAS code;
- monitoring for an EAS code by comparing the reference data with at least a portion of the broadcast audio data, to produce a match of the reference data with an EAS code present in the broadcast audio data; and
- modifying the first magnitude of the ancillary code to reduce the same to a zero level in response to the match, such that detectability of the EAS code in the broadcast audio data in accordance with a predetermined detection method is preserved.

2. The method according to claim 1 wherein the step of monitoring for an EAS code further comprises the step of correlating data points from the broadcast audio data with the reference data to produce a correlation value.

3. The method according to claim 2 further comprising the step of determining whether the correlation value is above a predetermined threshold value to produce the match.

4. The method according to claim 1 wherein the step of monitoring for an EAS code further comprises the step of correlating data points from a received signal with the reference data to detect data in the broadcast audio data having a predetermined EAS frequency.

5. The method according to claim 1 wherein the ancillary code comprises a sequence of code symbols each represented as a plurality of substantially single-frequency code components.

6. The method according to claim 1 wherein the monitored EAS code comprises an AFSK code.

7. The method according to claim 1 wherein the reference data has a defined frequency pattern and defined amplitude that correlates to a preamble of the EAS code.

8. The method according to claim 7 wherein the step of monitoring for an EAS code further comprises the step of monitoring for the preamble of the EAS code.

9. The method according to claim 1 wherein the first magnitude of the ancillary code is reduced to a zero level for a predetermined time period.

10. The method according to claim 9 wherein the first magnitude of the ancillary code is restored after the expiration of the predetermined time period.

11. The method according to claim 9 further comprising the step of restarting the predetermined time period each time the EAS code is detected.

12. A method of encoding an ancillary code in media data comprising the steps of:
- receiving the media data; encoding the media data with a first ancillary code having predetermined code characteristics and a first code detection priority;
- providing reference data corresponding to a second ancillary code having a second code detection priority higher than the first code detection priority and present from time to time in the media data;

comparing the reference data with at least a portion of the media data, to produce a match of the reference data with the second ancillary code when present therein; and modifying at least one of the predetermined characteristics of the first ancillary code to reduce the same to a zero level in response to the match, to ensure detectability of the second ancillary code in the media data in accordance with a predetermined detection method.

13. The method according to claim 12 wherein the reference data corresponds to an Emergency Alert System (EAS) code.

14. The method according to claim 13 wherein the reference data has a defined frequency pattern and defined amplitude that correlates to a preamble of the EAS code.

15. The method according to claim 14 wherein the step of monitoring for an EAS code further comprises the step of monitoring for the preamble of the EAS code.

16. A method of encoding an ancillary code in media data comprising the steps of:

receiving the media data;

encoding the media data with a first ancillary code having predetermined code characteristics and a first code detection priority;

detecting a second ancillary code in or to be included in the media data to produce detection data, the second ancillary code having a second code detection priority higher than the first code detection priority; and modifying at least one of the predetermined characteristics of the first ancillary code to reduce the same to a zero level for a predetermined time period in response to the detection data, to ensure detectability of the second ancillary code in the media data during the predetermined time period in accordance with a predetermined detection method.

17. The method according to claim 16 further comprising the step of providing reference data corresponding to the second ancillary code.

18. The method according to claim 17 wherein the reference data corresponds to an Emergency Alert System (EAS) code.

19. The method according to claim 18 wherein the reference data has a defined frequency pattern and defined amplitude that correlates to a preamble of the EAS code.

20. The method according to claim 19 wherein the step of monitoring for an EAS code further comprises the step of monitoring for the preamble of the EAS code.

21. The method according to claim 17 further comprising the step of restoring the predetermined code characteristics of the first ancillary code after the predetermined time period.

22. A method of encoding an ancillary code in media data comprising the steps of:

receiving the media data;

encoding the media data with a first ancillary code having predetermined code characteristics and a first code detection priority;

detecting a second ancillary code in or to be included in the media data to produce detection data, the second ancillary code having a second code detection priority higher than the first code detection priority; and assigning a zero level to at least one of the predetermined characteristics of the first ancillary code in response to the detection data, to ensure detectability of the second ancillary code in the media data in accordance with a predetermined detection method.

23. The method according to claim 22 further comprising the step of providing reference data corresponding to the second ancillary code.

24. The method according to claim 23 wherein the reference data corresponds to an Emergency Alert System (EAS) code.

25. The method according to claim 24 wherein the reference data has a defined frequency pattern and defined amplitude that correlates to a preamble of the EAS code.

26. The method according to claim 25 wherein the step of monitoring for an EAS code further comprises the step of monitoring for the preamble of the EAS code.

27. The method according to claim 22 wherein the at least one of the predetermined characteristics of the first ancillary code is assigned a zero level for a predetermined time period.

28. The method according to claim 27 wherein the at least one of the predetermined characteristics of the first ancillary code is restored after the expiration of the predetermined time period.

29. The method according to claim 27 further comprising the step of restarting the predetermined time period each time the second ancillary code is detected.

30. A system for encoding an ancillary code in broadcast audio data while preserving detectability of an Emergency Alert System (EAS) code therein, comprising:

an encoder for encoding broadcast audio data with an ancillary code having a first magnitude;

reference data corresponding to an EAS code; and a controller for monitoring for an EAS code by comparing the reference data with at least a portion of the broadcast audio data, to produce a match of the reference data with an EAS code present in the broadcast audio data and for reducing the first magnitude of the ancillary code to a zero level in response to the match, such that detectability of the EAS code in the broadcast audio data in accordance with a predetermined detection method is preserved.

31. The system according to claim 30 wherein the controller is operative to correlate data points from the broadcast audio data with the reference data to produce a correlation value.

32. The system according to claim 31 wherein the controller is operative to determine if the correlation value is above a predetermined threshold value to produce the match.

33. The system according to claim 30 wherein the controller is operative to correlate data points from a received signal with the reference data to detect data in the broadcast audio data having a predetermined EAS frequency.

34. The system according to claim 30 wherein the ancillary code comprises a sequence of code symbols each represented as a plurality of substantially single-frequency code components.

35. The system according to claim 30 wherein the monitored EAS code comprises an AFSK code.

36. The system according to claim 30 wherein the reference data has a defined frequency pattern and defined amplitude that correlates to a preamble of the EAS code.

37. The system according to claim 36 wherein the controller is operative to monitor for the preamble of the EAS code.

38. The system according to claim 30 wherein the controller is operative to reduce the first magnitude of the ancillary code to a zero level for a predetermined time period.

39. The system according to claim 38 wherein the controller is operative to restore the first magnitude of the ancillary code after the expiration of the predetermined time period.

40. The system according to claim 38 wherein the controller is operative to restart the predetermined time period each time the EAS code is detected.

41. A system for encoding an ancillary code in media data comprising:

an encoder for encoding media data with a first ancillary code having predetermined code characteristics and a first code detection priority;

reference data corresponding to a second ancillary code having a second code detection priority higher than the first code detection priority and present from time to time in the media data;

a controller for comparing the reference data with at least a portion of the media data, to produce a match of the reference data with the second ancillary code when present therein and for modifying at least one of the predetermined code characteristics of the first ancillary code to reduce the same to a zero level in response to the match, to ensure detectability of the second ancillary code in the media data in accordance with a predetermined detection method.

42. The system according to claim 41 wherein the reference data corresponds to an Emergency Alert System (EAS) code.

43. The system according to claim 42 wherein the reference data has a defined frequency pattern and defined amplitude that correlates to a preamble of the EAS code.

44. The system according to claim 43 wherein the controller is operative to monitor for the preamble of the EAS code.

45. A system of encoding an ancillary code in media data comprising:

an encoder for encoding media data with a first ancillary code having predetermined code characteristics and a first code detection priority; and a controller for detecting a second ancillary code in or to be included in the media data to produce detection data, the second ancillary code having predetermined code characteristics and a second code detection priority higher than the first code detection priority, the controller being operative to modify at least one of the predetermined characteristics of the first ancillary code to reduce the same to a zero level for a predetermined time period in response to the detection data, to ensure detectability of the second ancillary code in the media data during the predetermined time period in accordance with a predetermined detection method.

46. The system according to claim 45 further comprising reference data corresponding to the second ancillary code.

47. The system according to claim 46 wherein the reference data corresponds to an Emergency Alert System (EAS) code.

48. The system according to claim 46 wherein the reference data has a defined frequency pattern and defined amplitude that correlates to a preamble of the EAS code.

49. The system according to claim 48 wherein the controller is operative to monitor for the preamble of the EAS code.

50. The system according to claim 45 wherein the controller further restores the predetermined code characteristics of the first ancillary code after the predetermined time period.

51. A system of encoding an ancillary code in media data comprising:

an encoder for encoding media data with a first ancillary code having predetermined code characteristics and a first code detection priority; and a controller for detecting a second ancillary code in or to be included in the media data to produce detection data, the second ancillary code having predetermined code characteristics and a second code detection priority higher than the first code detection priority, the controller being operative to modify at least one of the predetermined characteristics of the first ancillary code to reduce the same to a zero level in response to the detection data, to ensure detectability of the second ancillary code in the media data in accordance with a predetermined detection method.

52. The system according to claim 51 further comprising reference data corresponding to the second ancillary code.

53. The system according to claim 52 wherein the reference data corresponds to an Emergency Alert System (EAS) code.

54. The system according to claim 53 wherein the reference data has a defined frequency pattern and a defined amplitude that correlates to a preamble of the EAS code.

55. The system according to claim 54 wherein the controller is operative to monitor for the preamble of the EAS code.

56. The system according to claim 51 wherein the controller is operative to modify the at least one of the predetermined characteristics of the first ancillary code to reduce the same to a zero level for a predetermined time period.

57. The system according to claim 56 wherein the controller is operative to restore the at least one of the predetermined characteristics of the first ancillary code after the expiration of the predetermined time period.

58. The system according to claim 56 wherein the controller is operative to restart the predetermined time period each time the second ancillary code is detected.

* * * * *